Nov. 18, 1947.  R. EKSERGIAN ET AL  2,431,295
LOAD TESTING APPARATUS AND METHOD
Original Filed April 24, 1941  2 Sheets-Sheet 1
FIG.1
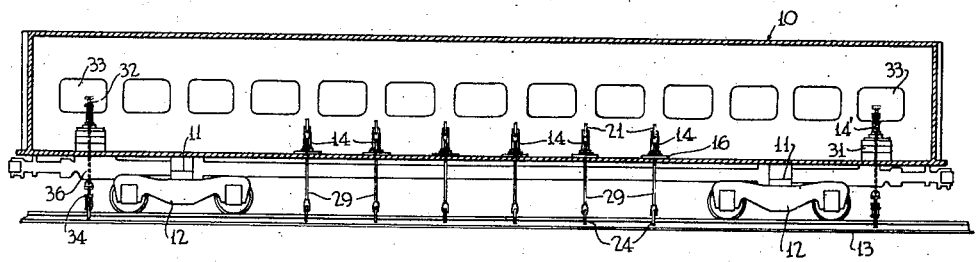
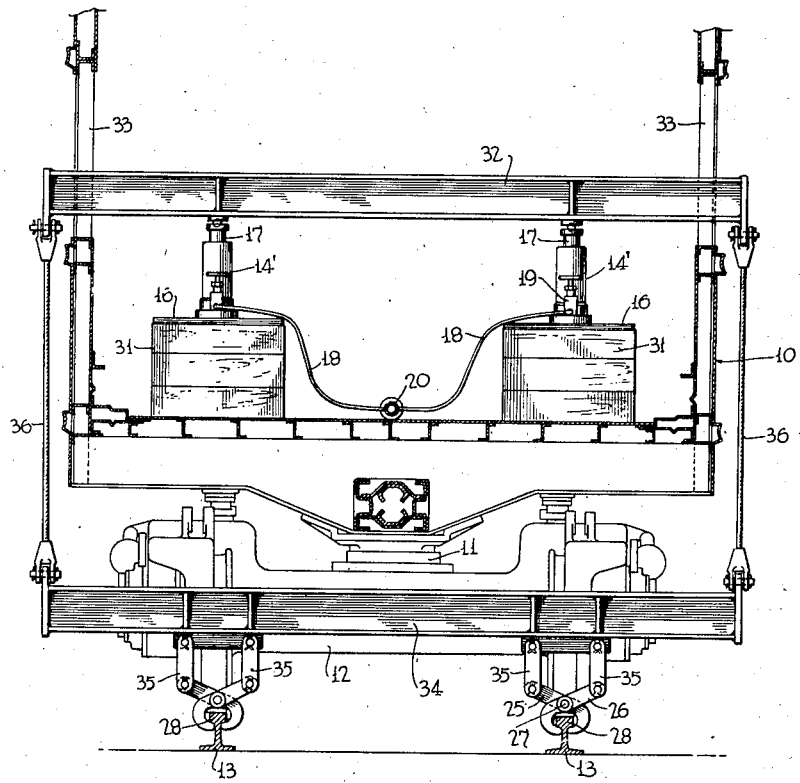
FIG.3
INVENTORS.
Rupen Eksergian
Axel O. Bergholm
BY John P. Tarbox
ATTORNEY Nov. 18, 1947.   R. EKSERGIAN ET AL   2,431,295
LOAD TESTING APPARATUS AND METHOD
Original Filed April 24, 1941   2 Sheets-Sheet 2

INVENTORS.
Rupen Eksergian
Axel O. Bergholm.
BY John P. Tarbot
ATTORNEY

Patented Nov. 18, 1947

2,431,295

UNITED STATES PATENT OFFICE 2,431,295

LOAD-TESTING APPARATUS AND METHOD

Rupen Eksergian, Media, and Axel O. Bergholm, Upper Darby, Pa., assignors to The Budd Company, Philadelphia, Pa., a corporation of Pennsylvania Continuation of application Serial No. 390,066, April 24, 1941. This application December 9, 1943, Serial No. 513,584

6 Claims. (Cl. 73—88)

1

The present application is a continuation of applicants' application Serial No. 390,066, Load-testing apparatus, filed April 24, 1941.

The invention relates to a testing apparatus and method, and more particularly to a load-testing apparatus and method well adapted for hollow beam structures, such as railway car bodies, supported adjacent their opposite ends.

Heretofore, it has been the general practice to test such body structures by loading them with heavy material of relatively small bulk for its weight, a common such material being sand in bags, each of 100 or more pounds in weight. These sand bags were fairly evenly distributed over the floor area of the body. The handling of these sand bags not only was fatiguing and time-consuming, but they were likely to become torn in handling, and some of the sand lost and/or scattered over the structure being tested. After a time of use, therefore, the weight of the bags might appreciably vary from the original weight, and this would result in lack of uniformity in loading, or loading different from that expected from the number and disposition of the bags used. The storage of the sand bags, when not in use, also took up considerable space, and, to prevent rapid deterioration of their fabric, required protection from the elements.

It is an object of the invention to avoid these difficulties in load-testing such structures, and to provide an apparatus for this purpose which is simple in construction, which can be readily applied to the structure and used over and over to test numerous structures, and by the use of which the loading can be accurately controlled and uniformly distributed, as desired.

It is a further object of the invention to provide such apparatus which is flexible in use, that is, which can be utilized to apply varying loads over the structure as a whole, or varying loads to different parts of the structure as desired, and in the use of which the loading can be effected from a single control station.

These objects are, in the main, achieved by the utilization of a plurality of independently movable expansible means or jacks, such as hydraulic jacks, which are distributed as units at spaced points upon the structure to be tested on that side thereof which is remote from the support of the structure, and by the utilization of a plurality of individual stress transmitting means each of which is connected to a small fraction only of the total number of the jacks, such as to one individual jack or, for instance, to two jacks. The jacks may be properly calibrated to deliver a

2 known thrust for a given hydraulic pressure, which can be readily determined by the operator from a suitable control station and pressure gauges in the common hydraulic pressure system connecting said jacks.

The jacks may be calibrated to deliver the same or different pressures depending upon the degree of loading desired in the various parts of the structure. They may comprise a casing having a base portion through which they may be secured to the structure to be tested in an upright position, the plungers or rams of the jacks being movable in applying the load away from the casing, and anchored to a fixed base to transmit the reaction of the thrust by suitable means.

These and further objects and advantages will become apparent from the following detailed description when read in connection with the drawings forming part hereof.

In the drawings:

Fig. 1 is a diagrammatic sectional elevation through a railway car, showing the invention applied thereto;

Fig. 3 is a transverse sectional view on an enlarged scale, showing an arrangement of the apparatus adjacent the end of the car.

Figure 2:
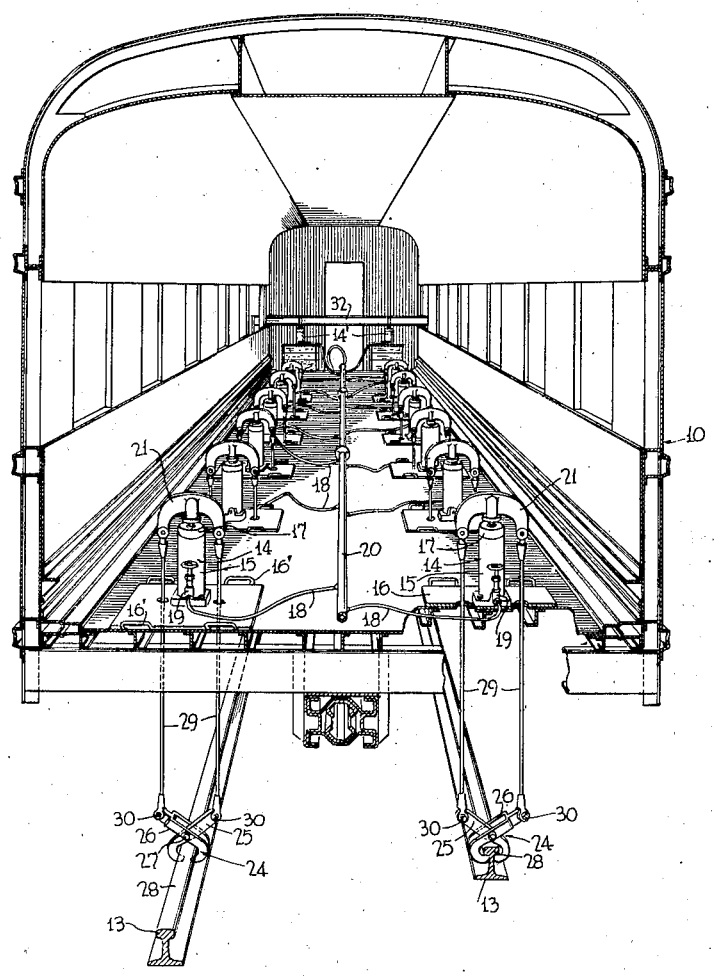
Fig. 2 is a perspective view of a car, on an enlarged scale and with one end broken away, looking into the interior thereof and showing the invention applied thereto.

In the form of the invention disclosed in the drawings, the hollow beam-type structure being tested is a railway car body, generally indicated at 10, this body being supported adjacent its ends in the usual manner on the center plates 11 of the trucks 12 which are in turn supported on the rails 13. These rails are strongly tied down to the foundation structure, not shown, so that they may serve to take the reactions from the loading.

In the particular test set-up shown, the hydraulic jacks 14 are arranged in two spaced rows extending between the trucks, the longitudinal and transverse spacing being such as to impart substantially equal loading upon the car structure in the region between the trucks. In the overhanging end portions of the car body beyond the trucks, two laterally spaced jacks 14' are employed. In the present case, the loading from these jacks is applied to the body by different means from the loading in connection with the remaining jacks, although it will be understood that the same type of arrangement could be used at the ends as is used intermediate the trucks where the structure being tested lends itself equally well to this arrangement.

Each of the jacks 14, 14' comprises, in the illustrated embodiment, a casing 15 rigidly secured to a base or foot 16 which rests on the car floor. The bases 16 may be provided with handles 16' to permit easy handling of the jacks. Within the casing 15 of each jack is mounted for vertical reciprocation a plunger or ram 17 provided with the head of the jack. Fluid under pressure is supplied through flexible pipe 18 to the space of the casing under the plunger to force it outwardly in the usual manner. Each jack may be provided with a valve, as 19, controlling the admission of fluid to the jack.

When equal loading is desired, each of the jacks 14 may be of identical capacity and suitably calibrated to deliver a known thrust for a given hydraulic pressure. The pipes 18 leading from the jacks 14, 14' are each connected to a main pipe 20 of larger cross-section, to which the hydraulic pressure is supplied from a suitable master cylinder, not shown, controlled from an operator's station, also not shown. A pressure gauge may be employed in the hydraulic system to indicate the pressure in the system.

With this arrangement, it will be seen that all of the jacks 14, 14' are simultaneously expanded by equal pressure, and that the loading is uniformly distributed throughout the structure.

Figure 4:
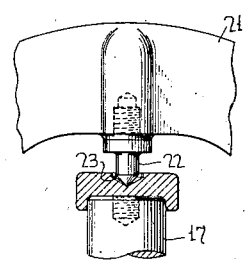
Fig. 4 is a detail view, showing the manner of supporting the yokes from the jacks.

To take the reaction from the vertical thrust of the plungers 17 of any of the jacks 14, there is provided a simple arrangement whereby this reaction may be taken by the rails 13. To this end, a yoke 21 of inverted U-shape is associated with each jack 14, this yoke being provided at its central portion with a downwardly projecting pointed pin 22 bearing in a conical recess 23 (see Fig. 4) formed in the head of the plunger 17. A tong-like clamp, designated generally by the numeral 24, is associated with each yoke 21, this clamp having two jaws 25, 26 hinged together at 27 and adapted through their curved ends to clamp around the head 28 of the rail 13. The straight ends of these jaws project away from each other and are connected, respectively, to the opposite ends of the associated yoke 21 by flexible cables 29, these flexible cables passing through openings provided in the base 16 and floor of the structure being tested. The lower ends of the cables are readily attached or detached from the jaws by pins 30.

With this arrangement, it will be seen that, when the pressure is supplied to expand the jack and apply the load, the tension of the cables 29 will cause the jaws 25, 26 to grip the rail more securely the greater the load.

Wherever it is not feasible to pass the cables through the floor of the structure, as where obstructions, such as the trucks, are arranged below the floor, the arrangement shown at the ends of the structure in Figures 1 and 2 and in the cross-section of Fig. 3, may be employed. According to this arrangement, the jacks 14', which may be of the same or different capacity from the jacks 14, have their bases 16 supported above the floor by spacing blocks 31, and their plungers 17 transmit their upward thrust to a transverse beam 32 which extends from side to side of the car body and out through the window openings, as 33. A beam 34 of similar length to the beam 32 extends across the body below the underframe and is secured to the rails 13 of the track by clamping jaws 25, 26 similar to the clamping jaws previously described, which have their straight arms connected to the beam 34 by links 35. The upper and lower beams 32 and 34 are connected at their ends by the flexible cable connections 36. It will be seen that the loading in this arrangement is achieved in very much the same manner as in the arrangement described previously, but this is done without passing the cables through the bases of the jacks or through the flooring of the body. This arrangement, while slightly more cumbersome than the arrangement previously described, has substantially the same advantages and adapts the apparatus for testing structures where it is not desired to provide holes in the flooring or frame.

Thus it will be seen that, with the apparatus set up as indicated, the entire car structure may be load-tested to the desired degree depending upon the pressures supplied to the main pipe of the hydraulic system, and this can be done from a single control station. It will be seen that the apparatus can be readily set up in connection with any car structure to be tested, and the loading can be very uniformly applied or, by the substitution of jacks of different capacities for certain of the jacks shown, the loading may be varied as desired.

While specific forms of the invention have been described herein, it will be understood that changes and modifications may be made by those skilled in this art without departing from the spirit and scope of the invention as set forth in the claims appended hereto.

What is claimed is:

1. In a load-testing apparatus for railway cars, a yoke supported in the car and above the floor thereof, separate means connected to the opposite ends of the yoke and traversing the plane of the floor of the structure to anchoring securement to a foundation, the anchoring securement comprising clamping jaws secured to the means connected to the opposite ends of the yoke, expansible means interposed between said yoke and the floor of said car and reacting in opposite directions against said yoke and floor to apply load to said structure.

2. In a load-testing apparatus for hollow beam type structures having openings in opposite side walls, a beam extending from side to side through said openings, a second beam extending from side to side below the test structure, flexible means interconnecting the adjacent ends of said beams, means for anchoring the lower beam to a foundation structure, and expansible means interposed between the floor of the test structure and said upper beam to apply load to said test structure.

3. In a load-testing apparatus for hollow beam type structures having openings in opposite side walls, a beam removably extending from side to side through said openings, means for removably anchoring the ends of said beam to a foundation structure, and expansible means interposed between and reacting against said test structure and the said beam to apply load to the test structure.

4. In a load-testing apparatus for hollow beam type structures, such as railway cars, having openings in opposite side walls, a beam of such length and cross sectional dimensions that it is adapted to be removably placed inside a beam type structure to be tested and to extend from side to side through the openings of and a short distance outwardly beyond the structure, a second beam of similar length and cross-sectional dimensions so that it is adapted for arrangement from side to side on the outside of the beam structure to be tested, means removably interconnecting the adjacent ends of said beams when the latter are arranged respectively in and outside of a structure to be tested, means for anchoring the second beam to a foundation structure, and expansible means of such shape and dimension as to adapt it to be removably inserted in a structure to be tested and interposed between the latter and said first beam so as to apply a test load to the beam structure.

5. In a load-testing apparatus for hollow beam type structures having openings in opposite side walls, such as railway car bodies; a yoke of such shape and dimensions as to be removably extendable through juxtaposed openings in the walls of a beam type structure to be tested, means for supporting the yoke in the interior of such test structure, means for removably connecting the ends of said yoke to one region of a stress-reaction structure, another remote region of said reaction structure being adapted to engage the same test structure, and expansible means forming one link of a chain of stress transmitting members which chain includes as members said yoke and said connecting means and being adapted to react against the interior of the beam type structure to be tested and said reaction structure.

6. Method of load-testing a hollow beam type structure such as a railway car, having openings in its opposite side walls comprising the steps of arranging a movable beam so that its ends extend through juxtaposed openings and its middle portion is arranged in the interior of the structure, of connecting the ends of the beam to a foundation structure, of supporting the middle portion of the beam on the structure and of applying oppositely directed stresses respectively between the middle portion of said beam and said beam type structure and between the ends of the beam and the foundation structure.

RUPEN EKSERGIAN.
AXEL O. BERGHOLM.

REFERENCES CITED

The following references are of record in the file of this patent:

UNITED STATES PATENTS

| Number | Name | Date |
|---|---|---|
| 1,147,153 | Emery | July 20, 1915 |
| 1,787,675 | Faus | Jan. 6, 1931 |
| 2,058,444 | Harrison | Oct. 27, 1936 |
| 2,158,008 | Grant, Jr. | May 9, 1939 |

FOREIGN PATENTS

| Number | Country | Date |
|---|---|---|
| 562,078 | Germany | Oct. 21, 1932 |